United States Patent [19]

Jackson et al.

[11] 4,113,346

[45] Sep. 12, 1978

[54] METHOD OF MAKING OPTICAL FIBER TERMINATIONS

[75] Inventors: Thomas M. Jackson, Stortford; Robert J. Hodges, Cheshunt, both of England

[73] Assignee: International Standard Electric Corporation, New York, N.Y.

[21] Appl. No.: 732,500

[22] Filed: Oct. 14, 1976

[30] Foreign Application Priority Data

Nov. 20, 1975 [GB] United Kingdom ............... 47764/75

[51] Int. Cl.² ................................................ G02B 5/14
[52] U.S. Cl. .................................. 350/96.20; 350/96.21
[58] Field of Search ....................................... 350/96 C

[56] References Cited

U.S. PATENT DOCUMENTS

| | | | |
|---|---|---|---|
| 3,846,010 | 11/1974 | Love et al. | 350/96 C X |
| 3,902,784 | 9/1975 | Dakss et al. | 350/96 C X |
| 3,982,815 | 9/1976 | Nakayama | 350/96 C |

FOREIGN PATENT DOCUMENTS 2,363,984  6/1975  Fed. Rep. of Germany ........ 350/96 C

OTHER PUBLICATIONS

M. L. Dakss, A. Bridger, "Plug-in Fibre-to-Fibre Coupler", Electronics Letters, Jul. 11, 1974, vol. 10, No. 14, pp. 280–281.

*Primary Examiner*—John K. Corbin
*Assistant Examiner*—Rolf Hille
*Attorney, Agent, or Firm*—Thomas L. Peterson

[57] ABSTRACT

A ferrule terminated optical fiber in which the fiber is held only approximately on the axis of the ferrule on the sides of which flat reference surfaces are subsequently machined. Machining is performed to a predetermined distance from the center of a fiber core, the position of which is revealed by launching light into the fiber from the other end. Providing the reference surfaces as a last manufacturing step avoids the problems of cumulative errors which arise from assembling parts having dimensional tolerances, together with the error resulting from distortion liable to occur during the setting of the adhesive holding a fiber in a ferrule.

3 Claims, 5 Drawing Figures

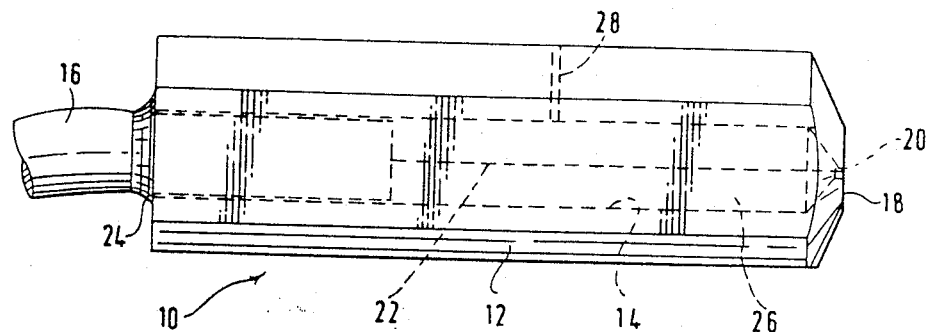
FIG.1.
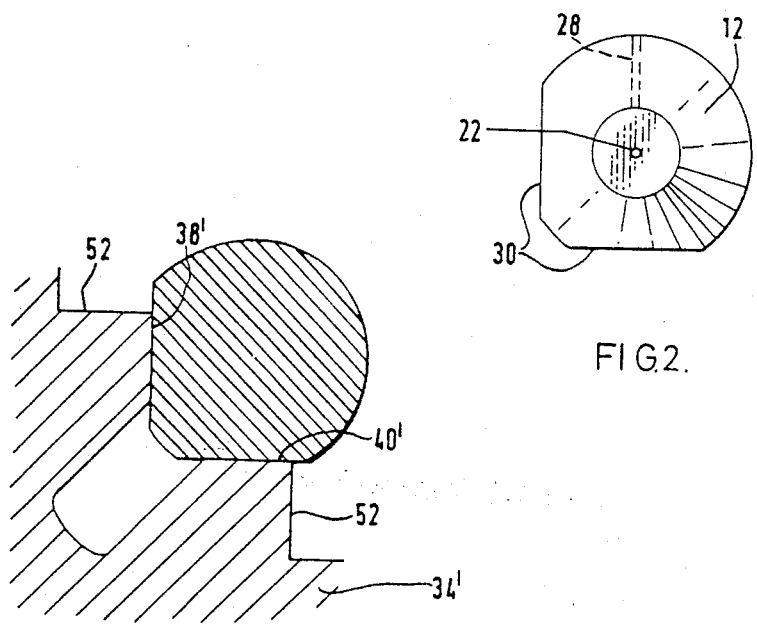
FIG.2.
FIG. 5.

METHOD OF MAKING OPTICAL FIBER TERMINATIONS

BACKGROUND OF THE INVENTION

This invention relates to demountable optical fiber connectors and/or optical fiber terminations therefor.

A particularly important consideration in the construction of a practical demountable optical fiber connector is the manner in which precise lateral alignment of two butted fiber cores is to be achieved.

One approach to this problem of lateral alignment is to mount the fiber ends in ferrules that are accurately sized and in which the fiber cores are accurately centered. The ferrules then serve as reference surfaces and two fiber ends may be brought into lateral alignment by holding the ferrules against the walls of a V-groove. The mounting of each fiber end in its associated ferrule may be done, for instance, by potting the fiber end in a resin filling the bore of a ferrule. With this approach there is first the problem of obtaining the initial alignment of the fiber and ferrule, and then the second problem of retaining the alignment while the resin is cured. Many alignment methods that are not purely optical involve alignment errors that can be cumulative. Thus, for instance, misalignment may be introduced because the inside and outside surface of the ferrule are not accurately concentric, and also because the fiber core is not accurately centered within its cladding. When these errors are added to that introduced by distortion occurring during resin curing, it is difficult if not impossible to get good yields of terminations satisfying the very stringent requirements of low loss connectors.

SUMMARY OF THE INVENTION

According to a principal aspect of the invention, there is provided a method of making an optical fiber termination for use in a demountable optical fiber connector wherein an optical fiber is secured in a ferrule to lie approximately along the ferrule axis. Either before or after being thus secured, the optical fiber is provided with a polished fiber end face located flush with one end of the ferrule. The ferrule is mounted in a jig. Light is directed through the fiber from its other end to reveal the position of the fiber core at the ferrule end. A first flat surface is ground on the side of the ferrule a predetermined distance from said core and a second flat surface is then ground on the side of the ferrule at the same distance from said core but at an angle to said first flat surface.

BRIEF DESCRIPTION OF THE DRAWINGS

FIGS. 1 and 2 are side and end elevational views of a ferrule terminated optical fiber in accordance with the invention;

FIG. 5 is a transverse sectional view of a modified form of connector.

DESCRIPTION OF THE PREFERRED EMBODIMENTS

Figure 3:
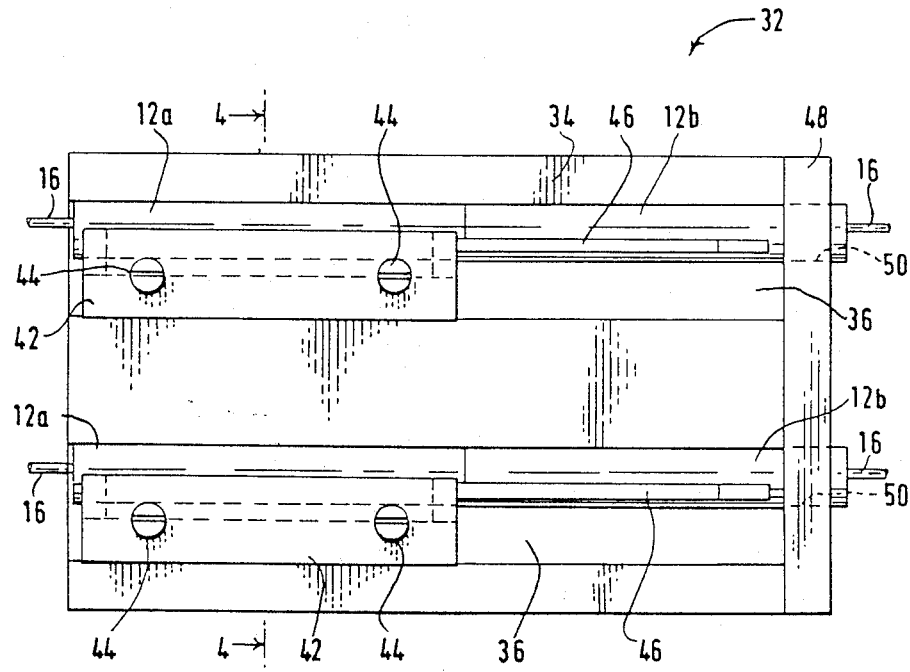
FIG. 3 is a top plan view of an optical fiber connector employing two pairs of ferrule terminated optical fibers, as shown in FIGS. 1 and 2.

An optical fiber ferrule termination 10 is shown in FIGS. 1 and 2 and includes a cylindrical metal ferrule 12 having a central bore 14 large enough to accommodate a plastic coated optical fiber 16. The bore 14 terminates close to one end 18 of the ferrule in a short small-diameter region 20 where it is only large enough to accommodate the fiber that has had its plastic coating stripped off.

A length of the plastic coating is stripped from one end of an optical fiber 16 and the stripped or bare end 22 is inserted into the ferrule until it protrudes through the small diameter part 20 of the ferrule bore and the coated portion of fiber is engaged within the large diameter part 14. The fiber is secured in position in the ferrule firstly by the application of a fillet 24 of a quick-setting adhesive, such as a cyanoacrylate adhesive, and then by filling the interior with a resin 26, such as an epoxy resin, dispensed through a hole 28 in the sidewall of the ferrule. After the resin 26 has been cured, the protruding end of bare fiber 22 is cropped off, and the ferrule end 18 is lapped flat and polished.

The ferrule is preferably made of a low coefficient of thermal expansion nickel-cobalt-iron alloy in order to minimize dimension errors in subsequent machining attributable to local heat generation during the machining process. For a typical optical fiber having an external diameter of about 100 μm coated with a plastic coating having an external diameter of about 1 mm, a typical ferrule will be 3 mm in external diameter and between 1 and 2 cm in length. In spite of the small size of the diameter of the bare fiber 22, it is preferred that the small diameter portion 20 of the ferrule bore be not much larger than that of the bare fiber. This is partly because the small diameter portion 20 thereby serves to hold the fiber approximately on the ferrule axis, and partly because it is preferred, when lapping and polishing the ferrule end face, not to have too large an area of resin surrounding the end face of the fiber. Some difficulty may be encountered in creating the small diameter portion of the ferrule bore by drilling without producing a burr on the inside of the ferrule which may tend to inhibit the threading of the bare region of the fiber. An alternative and preferred method of making this small hole is by spark erosion. A further alternative method is to make a much larger hole in which a suitable bushing is fitted. Such a bushing (not shown) may conveniently be a watchmakers pierced bearing jewel. Preferably such a jewel is mounted with its oil retaining recess facing inwardly so that this helps to guide the bare fiber through the central aperture.

The requirement to lap and polish the end face of the ferrule in order to provide an optical finish to the end face of the fiber can be avoided if the fiber is first provided with an optical finish, and thereafter secured in the ferrule. In this instance the optical finish for the fiber end may be provided by the technique of lightly scoring the fiber and breaking it under tension. Although lapping and polishing are thereby avoided the technique involves the additional critical requirements of holding the fiber end flush with the ferrule end while the fiber is being secured within the ferrule and of ensuring that the resin does not penetrate past the fiber end.

When the fiber has been secured within the ferrule and provided with an optical finish to its end face, the ferrule is mounted in a jig of a grinding machine ready for grinding a pair of flats 30 on the ferrule side. Both flats have to be an equal predetermined distance from the fiber core 22. The position of the core is revealed by directing light into the opposite end of the fiber and by observing the illuminated core at the ferrule end 18 with a travelling microscope. After the first flat has been ground the jig is turned through a right angle ready for grinding the second flat. In general, this rotation will not be exactly about the core axis, and hence, the grinding wheel will need to be repositioned for grinding the second flat.

By way of example, with a 3 mm diameter ferrule the predetermined distance of the flats from the fiber core is a precisely determined value in the range 1.0 to 1.5 mm in width striking a compromise between the requirement of providing a bearing surface that is large enough not to wear too quickly and yet is small enough to minimize the risk of trapping dust or grit between these surfaces and the cooperating surfaces of a connector body.

Figure 4:
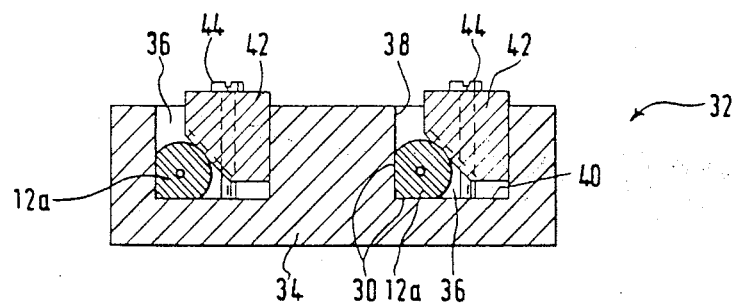
FIG. 4 is a sectional view taken on the line 4—4 shown in FIG. 3.

Referring now to FIGS. 3 and 4, there is shown an optical fiber connector 32 for connecting two pairs of ferrule terminated optical fibers. The connector body 34 has two right angled V-grooves 36 provided by plane polished bearing surfaces 38 and 40. A ferrule 12a is mounted in each V-groove 36 and is clamped with its flat surfaces 30 against the walls of the groove by a clamping plate 42 secured by screws 44 to the body 34. The central portion of each clamping plate may be relieved so that only its end portions bear against the ferrule. Protruding axially from one end of each clamping plate is an associated leaf-spring 46 for holding a mating ferrule 12b in the V-groove against the bearing surfaces 38 and 40. Optionally, the body 34 may have a raised portion 48 with two apertures 50 providing keyways ensuring that the ferrules can only be introduced under the leaf-springs with the appropriate orientation for the leaf springs to press the ferrule flats against the bearing surfaces.

A modified form of V-groove is depicted in FIG. 5 in which the bearing surfaces 38', 40' are formed on projections 52 standing upwardly of a body 34' to facilitate their being maintained in a clean condition.

What is claimed is:

1. A method of making an optical fiber termination for use in a demountable optical fiber connector comprising the steps of:
   providing an optical fiber having a core and a front end face;
   securing the optical fiber in a ferrule to lie approximately along the ferrule axis;
   locating the front end face of the fiber flush with one end of the ferrule;
   directing light through the fiber from the end thereof opposite to said front end face to provide a visible reference point at the core of said fiber;
   forming a first flat surface on the side of the ferrule a predetermined distance from said reference point; and
   forming a second flat surface on the side of the ferrule at the same distance from said reference point as said first flat surface but at an angle to said first flat surface.

2. A method as set forth in claim 1 wherein:
   said two flat surfaces are formed at right angles to each other.

3. An optical fiber termination which has been made by the method of claim 1.

* * * * *